United States Patent
Cohen et al.

(10) Patent No.: US 8,549,480 B2
(45) Date of Patent: Oct. 1, 2013

(54) MAINTENANCE FOR AUTOMATED SOFTWARE TESTING

(75) Inventors: Ayal Cohen, Yehud (IL); Gabriel Braslavsky, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1404 days.

(21) Appl. No.: 12/239,753

(22) Filed: Sep. 27, 2008

(65) Prior Publication Data

US 2009/0288070 A1 Nov. 19, 2009

Related U.S. Application Data

(60) Provisional application No. 61/052,769, filed on May 13, 2008.

(51) Int. Cl.
*G06F 9/44* (2006.01)

(52) U.S. Cl.
USPC ............ 717/125; 717/113; 717/115; 717/127

(58) Field of Classification Search
None
See application file for complete search history.

(56) References Cited

U.S. PATENT DOCUMENTS

| | | | |
|---|---|---|---|
| 5,475,843 A * | 12/1995 | Halviatti et al. | 717/124 |
| 5,602,729 A * | 2/1997 | Krueger et al. | 717/124 |
| 5,657,438 A * | 8/1997 | Wygodny et al. | 714/1 |
| 6,738,933 B2 * | 5/2004 | Fraenkel et al. | 714/47.2 |
| 7,003,743 B2 * | 2/2006 | Abadir et al. | 716/107 |
| 7,093,238 B2 * | 8/2006 | Givoni et al. | 717/129 |
| 7,305,659 B2 * | 12/2007 | Muller et al. | 717/127 |
| 7,421,683 B2 * | 9/2008 | Robertson et al. | 717/130 |
| 7,509,538 B2 * | 3/2009 | Triou, Jr. et al. | 714/48 |
| 7,673,292 B2 * | 3/2010 | Vikram | 717/135 |
| 7,861,120 B2 * | 12/2010 | Cui | 714/38.1 |
| 7,870,540 B2 * | 1/2011 | Zare et al. | 717/126 |
| 7,934,201 B2 * | 4/2011 | Sweis | 717/124 |
| 7,958,495 B2 * | 6/2011 | Kelso | 717/124 |
| 8,126,581 B2 * | 2/2012 | Kostyk et al. | 700/110 |
| 8,151,276 B2 * | 4/2012 | Grechanik et al. | 719/316 |
| 8,365,147 B2 * | 1/2013 | Grechanik et al. | 717/124 |
| 2003/0126586 A1 * | 7/2003 | Sluiman et al. | 717/124 |
| 2003/0149945 A1 * | 8/2003 | Abadir et al. | 716/3 |
| 2004/0034847 A1 * | 2/2004 | Joffrain et al. | 717/113 |
| 2004/0044992 A1 * | 3/2004 | Muller et al. | 717/124 |
| 2005/0216793 A1 * | 9/2005 | Entin et al. | 714/38 |
| 2006/0156287 A1 * | 7/2006 | Vikram | 717/124 |
| 2007/0022407 A1 * | 1/2007 | Givoni et al. | 717/124 |
| 2008/0051924 A1 * | 2/2008 | Kostyk et al. | 700/109 |
| 2008/0092119 A1 * | 4/2008 | Sweis | 717/124 |
| 2008/0209276 A1 * | 8/2008 | Stubbs et al. | 714/38 |
| 2008/0244523 A1 * | 10/2008 | Kelso | 717/124 |
| 2008/0244524 A1 * | 10/2008 | Kelso | 717/124 |

(Continued)

OTHER PUBLICATIONS

Mercury QuickTest Professional User's Guide Version 8.0.1, published by Mercury, 2004, pp. 1-10, 33-81, 482-484 288-298, 409-435, 482-484.*

*Primary Examiner* — Tuan Q. Dam
*Assistant Examiner* — Zheng Wei

(57) ABSTRACT

Embodiments of a maintenance mode for automated testing are provided. In this regard, an embodiment of a system, among others, comprises a software application; a test script for testing the software application; an object repository comprising objects belonging to the software application; and a maintenance mode, wherein if a step in the test script fails, the maintenance mode prompts a tester to change at least one of the test script and the object repository.

20 Claims, 12 Drawing Sheets

(56) References Cited

U.S. PATENT DOCUMENTS

| | | | |
|---|---|---|---|
| 2008/0282230 A1* | 11/2008 | Belvin et al. | 717/125 |
| 2009/0187823 A1* | 7/2009 | Farrell et al. | 715/700 |
| 2009/0217100 A1* | 8/2009 | Grechanik et al. | 714/38 |
| 2009/0217302 A1* | 8/2009 | Grechanik et al. | 719/320 |
| 2009/0217303 A1* | 8/2009 | Grechanik et al. | 719/320 |
| 2009/0265588 A1* | 10/2009 | Kopel | 714/710 |

* cited by examiner

FIG. 13

MAINTENANCE FOR AUTOMATED SOFTWARE TESTING

CROSS REFERENCE TO RELATED APPLICATIONS

This Application claims the benefit of provisional U.S. patent application Ser. No. 61/052,769, filed May 13, 2008, titled "Maintenance For Automated Software Testing", which application is hereby incorporated by reference herein as if reproduced in full below.

BACKGROUND

1. Technical field

This disclosure generally relates to maintenance for automated software testing.

2. Description of the Related Art

Software failures can put a business at risk and affect the credibility of software development and information technology staff in the eyes of business managers. Therefore, extensive testing of software applications is an important part of software development. A Quality Assurance (QA) organization may automate testing to thoroughly test an application under test (AUT). Automated testing may be used for many types of testing, such as functional testing, graphical user interface (GUI) testing, Service Oriented Architecture (SOA) integration, and regression testing, to reduce the risks of application failures.

Automated testing may be performed in an automated testing environment. An automated testing environment allows a tester to input an automated test simulating a user interacting with an AUT, and then repeatedly execute the AUT using the automated test in order to find errors in the AUT and ensure that the AUT behaves as it should on subsequent executions. If the AUT changes, the automated test may also need to be changed to reflect the changes to the AUT. Changing the automated test may be a complex process, as the automated test may need to be completely rewritten from the beginning to interact properly with the changed AUT, or the tester may need to go step-by-step through the automated test to find the source of the error. As the AUT may change many times during a testing cycle, updating the automated test may become costly and time consuming.

SUMMARY

Embodiments of a maintenance mode for automated testing are provided. In this regard, an embodiment of a system, among others, comprises a software application; a test script for testing the software application; an object repository comprising objects belonging to the software application; and a maintenance mode, wherein if a step in the test script fails, the maintenance mode prompts a tester to change at least one of the test script and the object repository.

An embodiment of a method, among others, comprises running a test script; if a step in the test script fails, analyzing the test script, the software application, and the object repository; and prompting a tester to change at least one of the test script and the object repository based on the analysis.

An embodiment of a computer readable medium comprising a program for a maintenance mode, among others, comprises the steps of running a test script; if a step in the test script fails, analyzing the test script, the software application, and the object repository; and prompting a tester to change at least one of the test script and the object repository based on the analysis.

Other systems, methods, features, and/or advantages of this disclosure will be or may become apparent to one with skill in the art upon examination of the following drawings and detailed description. It is intended that all such additional system, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIG. 13 shows an embodiment of an action and iteration summary dialog.

DETAILED DESCRIPTION

Embodiments of a maintenance mode allow a tester (for example, a QA engineer) to update an automated test of an application under test (AUT) when the AUT is changed. Embodiments of the maintenance mode assist a tester in fixing an automated test during run time and allow the tester to continue with the test run. Embodiments of a maintenance mode may be used in conjunction with Hewlett Packard's QuickTest Professional (see https://h10078.www1.hp.com/cda/hpms/display/main/hpms_content.jsp?zn=bto&cp=1-11-127-24%5E1352_4000_100_, or any other automated testing environment.

Some embodiments of an automated test comprise two parts: a script and an object repository. The script may comprise a series of steps. Embodiments of a script include a script written by the tester in a programming language such as, for example, visual basic (VB). Alternatively, the automated testing package may capture checkpoints as the tester, acting as a user, interacts with the AUT, and record a macro of the tester's actions; the macro may be the script The automated testing environment runs and replays the AUT using the script to ensure that the AUT executes correctly on subsequent executions. The script interacts with the AUT via objects, which are listed in an object repository. Embodiments of an object repository contain a list of the objects belonging to the AUT that the script uses to interact with the AUT. An object may be a button, a dialog box, a drop-down menu, an input field, or any other entity in or associated with the AUT through which a user may interact with the AUT or provide input to the AUT.

If the AUT is changed, the object repository and/or the script may be updated to reflect the change to the AUT. The script may fail if an object in the object repository or an object referenced in the script does not match up with a corresponding object in the AUT. Embodiments of a maintenance mode launch an interactive graphical user interface (GUI) when an error occurs in the automated test, enabling the tester to correct the source of the error during run-time of the automated test. Embodiments of a maintenance mode may further analyze the AUT, script, and object repository, and make suggestions to the tester based on the analysis as to how best fix the problem. The maintenance mode may change the script, the object repository, or both, as necessary, to match up with the changed AUT. When the maintenance mode makes a change, it may add a comment to the script or object repository to indicate modification by the maintenance mode.

Figure 1:
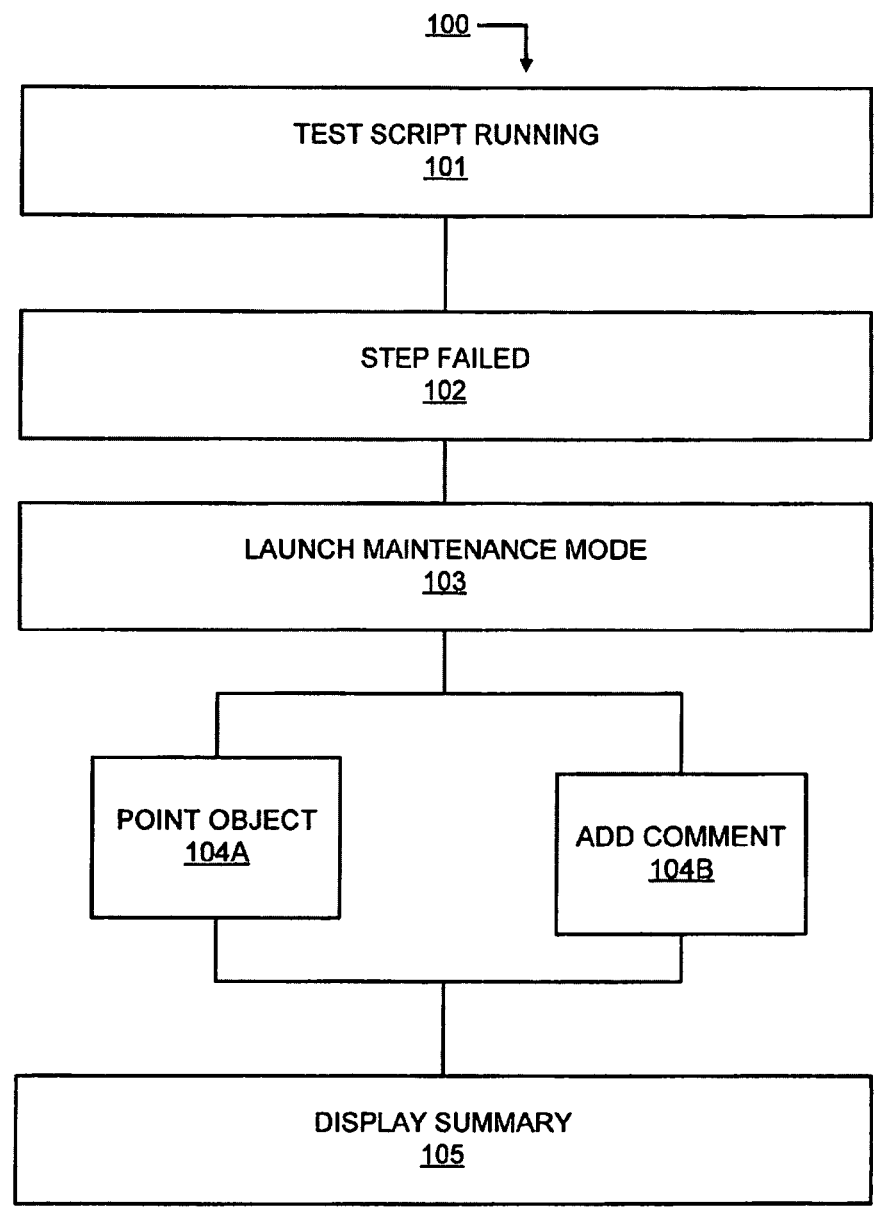
FIG. 1 shows a flowchart of an embodiment of an automated test comprising a maintenance mode.
Figure 4:
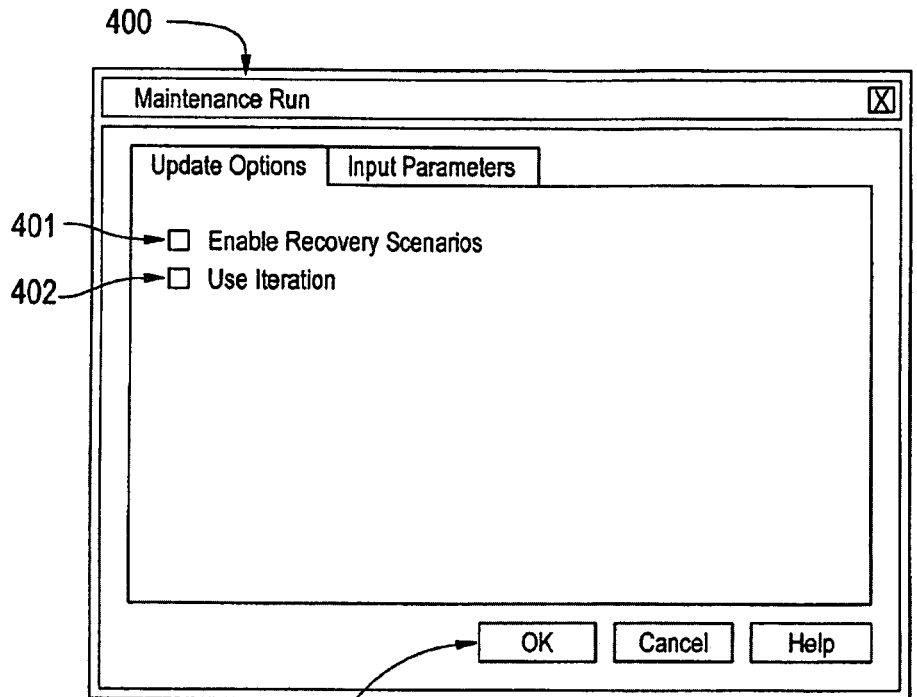
FIG. 4 shows an embodiment of a maintenance start dialog.

FIG. 1 shows an embodiment of a flowchart 100 of an automated test comprising a maintenance mode. The test begins with a maintenance start dialog; an embodiment of a maintenance start dialog 400 is shown in FIG. 4. The maintenance start dialog 400 prompts the tester to specify whether or not to use recovery scenarios, or to run all iterations during the course of the automated test. The maintenance start dialog offers checkboxes 401 and 402 to disable or enable using recovery scenarios or running all iterations, respectively; in some embodiments, both checkboxes are not checked by default. When the tester clicks OK button 403, the test script commences running and testing of the AUT in block 101.

Figure 5:
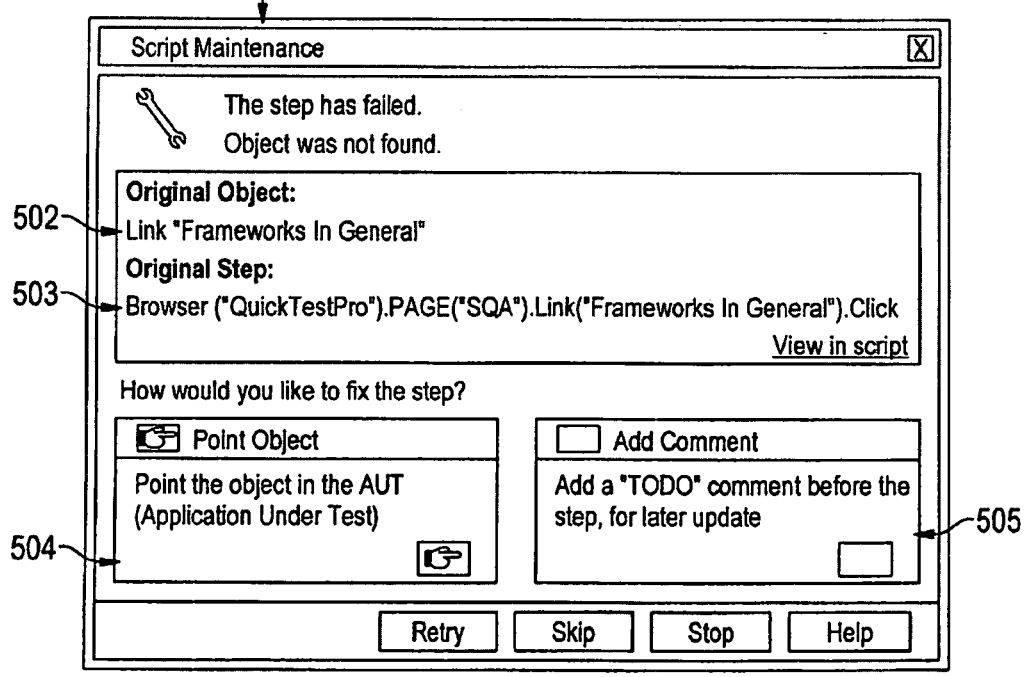
FIG. 5 shows an embodiment of script maintenance dialog.

When a step fails in block 102, the maintenance mode launches in block 103 and the tester is shown a script maintenance dialog. FIG. 5 shows an embodiment of a script maintenance dialog 500; dialog 500 displays the object 502 referenced in the script and step 503 in the script in which the object was referenced that are the source of the error, and in one embodiment offers the tester two options to address the error: point object 504 and add comment 505. The tester may choose to click on a button icon 504 corresponding to point object, which executes in block 104A, or click on a button icon 505 corresponding to add comment, which executes in block 104B. When the point object 104A or add comment 104B procedures finish, the maintenance mode displays a summary of all changes made to the automated test by the maintenance mode in block 105.

Figure 2:
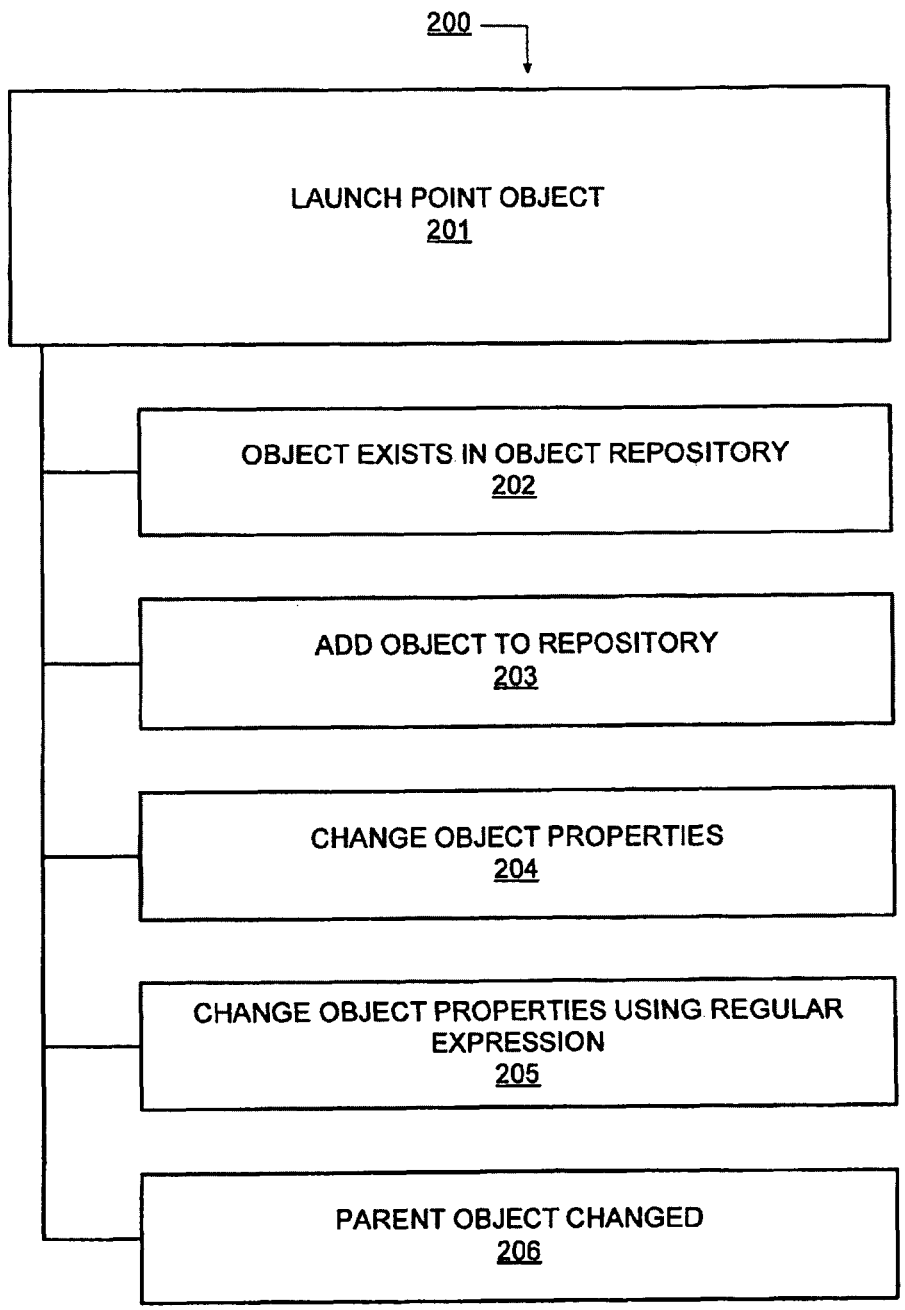
FIG. 2 shows a flowchart of an embodiment of a point object procedure.

FIG. 2 shows an embodiment of a point object procedure 200. If the tester selects the point object button icon 504, the maintenance mode launches point object at block 201. Point object analyzes the AUT, the test script and the object repository. Depending on the results of the analysis, the point object procedure may offer the tester one of at least 5 options.

Figure 6:
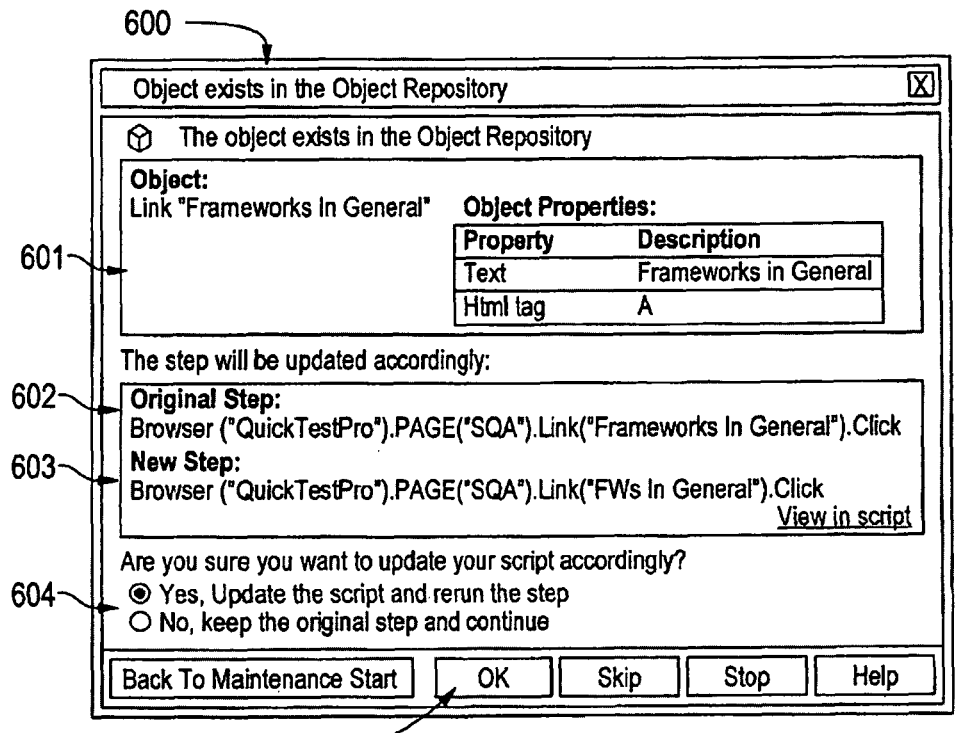
FIG. 6 shows an embodiment of a dialog for pointing to an object already in the object repository.

If the object referred to in the script exists in the object repository, but, for example, the corresponding objects name has changed in the AUT from the name used in the script and object repository, the user is given the option to change the object's name in the script and the object repository in block 202. An embodiment of an "object exists" dialog box 600 is shown in FIG. 6. Dialog 600 lists the object in the object repository 601, as well as the step that caused the error 602. The maintenance mode suggests a corrected step 603 that uses the name of the corresponding object in the AUT. The tester may either accept or reject suggestion 603 using input field 604, and then click the OK button 605 to continue. If the tester accepts suggestion 603, the object name in the object repository and the step in the script are changed to match up with the corresponding object in the AUT. In some embodiments, when a step is replaced, the old step is commented out of the script; in some embodiments, the old step may be deleted from the script.

Figure 7:
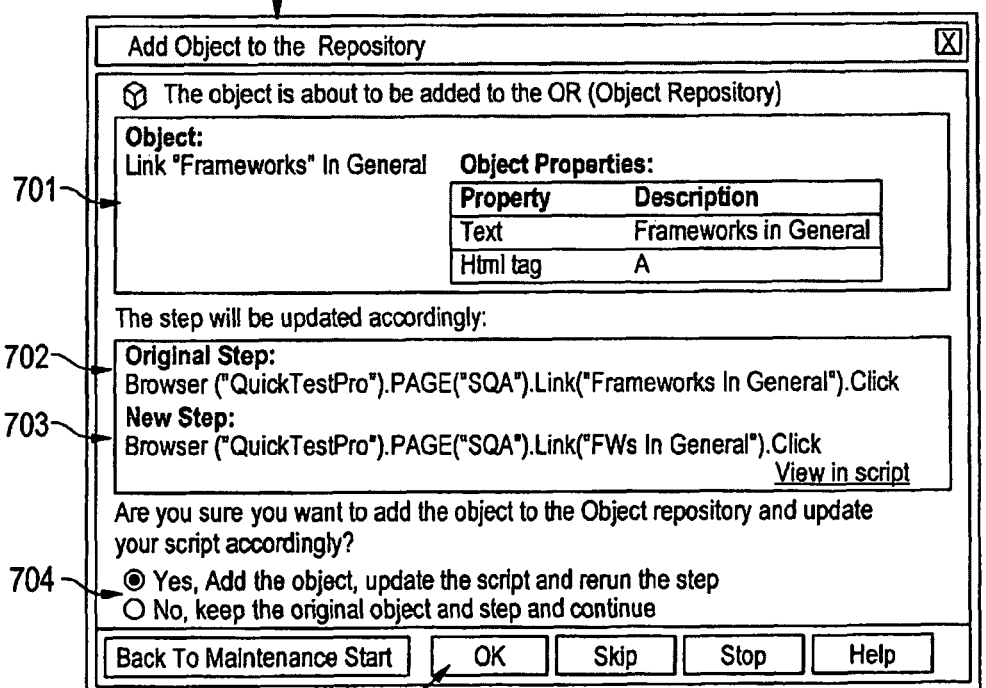
FIG. 7 shows an embodiment of a dialog for adding an object to the object repository.

If the corresponding object in the AUT has changed (for example, from a button to a link), an embodiment of a maintenance mode may suggest adding a new object to the object repository to match the object in the AUT and updating the script to reference the new object in block 203. An embodiment of an "add object" dialog box 700 is shown in FIG. 7. Dialog 700 suggests a new object 701 to add to the object repository, and suggests an updated step 703 to replace step 702. In some embodiments, when a step is replaced, the old step is commented out of the script; in some embodiments, the old step may be deleted from the script. The tester may either accept or reject suggestion 703 using input field 704, and then click the OK button 705 to continue.

Figure 8:
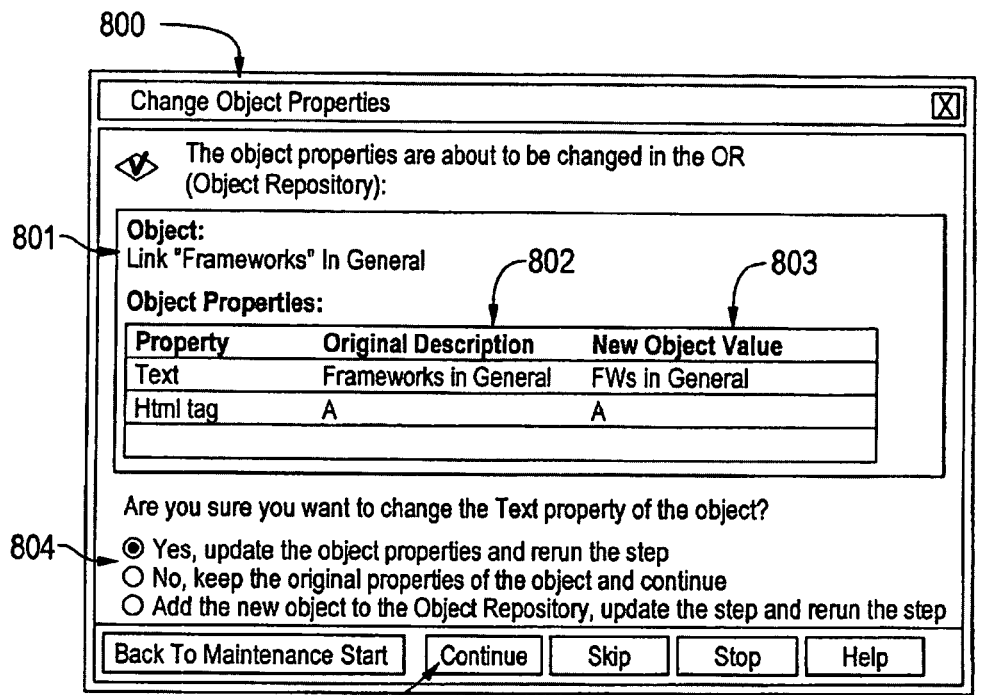
FIG. 8 shows an embodiment of a dialog for changing object properties.

If one or more properties of an object in the AUT has been changed, then the automated test may fail because the right object can not be found in the object repository. In this case, the maintenance mode offers the tester the option of updating the object's description in the object repository in block 204. An embodiment of a "change object properties" dialog box 800 is shown in FIG. 8. The object 801 in the object repository is listed, with original description 802 and suggested new description 803. The tester may either accept or reject suggestion 803 using input field 804, and then click the continue button 805.

Figure 9:
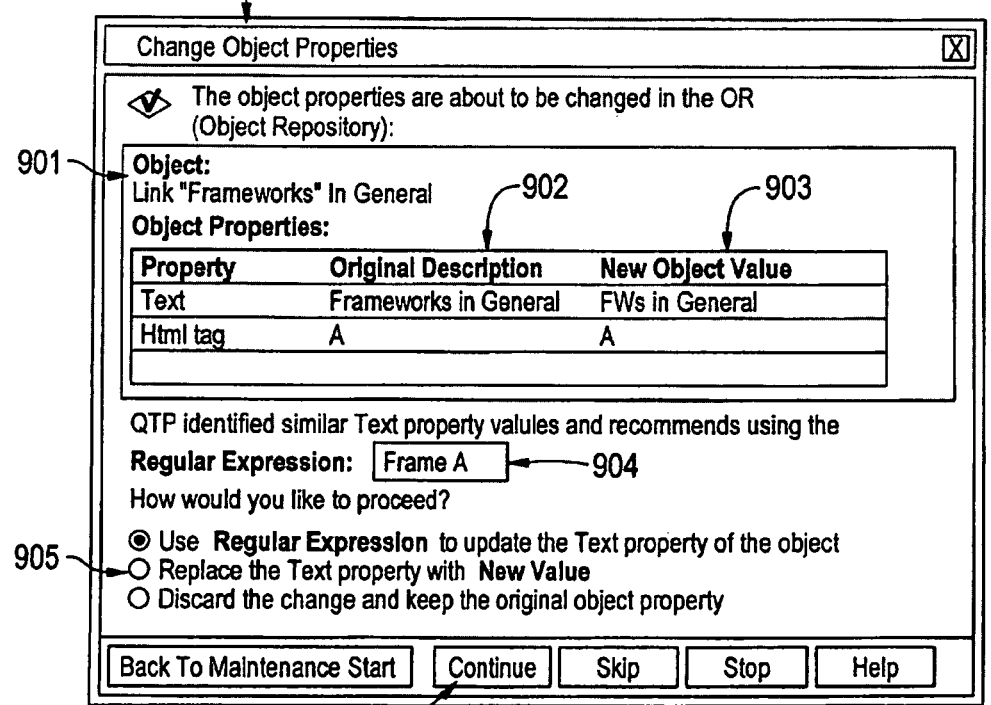
FIG. 9 shows an embodiment of a dialog for changing object properties using a regular expression.

If properties of the object in the object repository need to be changed to match up with an object in the AUT, and maintenance mode determines that a regular expression is appropriate, the "change object properties using regular expression" dialog box is presented to the tester in block 205, an embodiment of which is shown in FIG. 9, element 900. A regular expression, or pattern, is a syntax that is used describe sets of strings. If an object is named using a regular expression, any member of the set of strings that is described by the regular expression may be used to refer to the object. For example, the set containing the strings "Calculator" and "Calcator" can be described by the regular expression Calc(ul)?ator; an object named with the regular expression Ca!c(ul)?ator may therefore be referred to by either of the strings "Calculator" or "Calcator". Use of regular expressions may allow for flexibility in object naming and object references. For more detail regarding construction and use of regular expressions, see, for example, Tony Stubbeline, "Regular Expression Pocket Reference", O'Reilly Media, Inc., May 2003. Referring again to FIG. 9, The object 901 is displayed to the tester, with the original description 902, suggested new description 903, and suggested regular expression description 904. The suggested regular expression 904 may be edited by the tester in some embodiments. The tester may either accept or reject the suggestions 903 and 904 using input field 905, and then click the continue button 906.

Object in the object repository may be organized in a hierarchy of parent and child objects. A button on a dialog box in the AUT may be described as Dialog ("MyDialog").Button ("MyButton"); in this example, the dialog box is the parent object, and the button is the child object. When the properties of the dialog box are changed, any references to the button must be changed as well to match the new properties of the dialog box. The description of the button itself, however, may not be changed. Child objects may be located at runtime under the context of parent objects. If the maintenance mode determines that the properties of a parent of an object in the AUT have changed, the maintenance mode, in block 206, performs analysis of the parent object, the AUT, the object repository, and the test script, and offer one of the previously outlined options 202-205 to the tester for the parent object, based on the analysis.

Alternatively, when the script encounters an error in block 102 and launches maintenance mode in block 103 of FIG. 1, the tester may select the add comment option 104B via the add comment option (FIG. 5, element 505). When the tester selects add comment in block 104B, the tester may be prompted to add a comment to the script that marks a place in the script that needs to be addressed. The comment may also be added to a to-do list to remind the tester to handle the problem in some embodiments.

Figure 3:
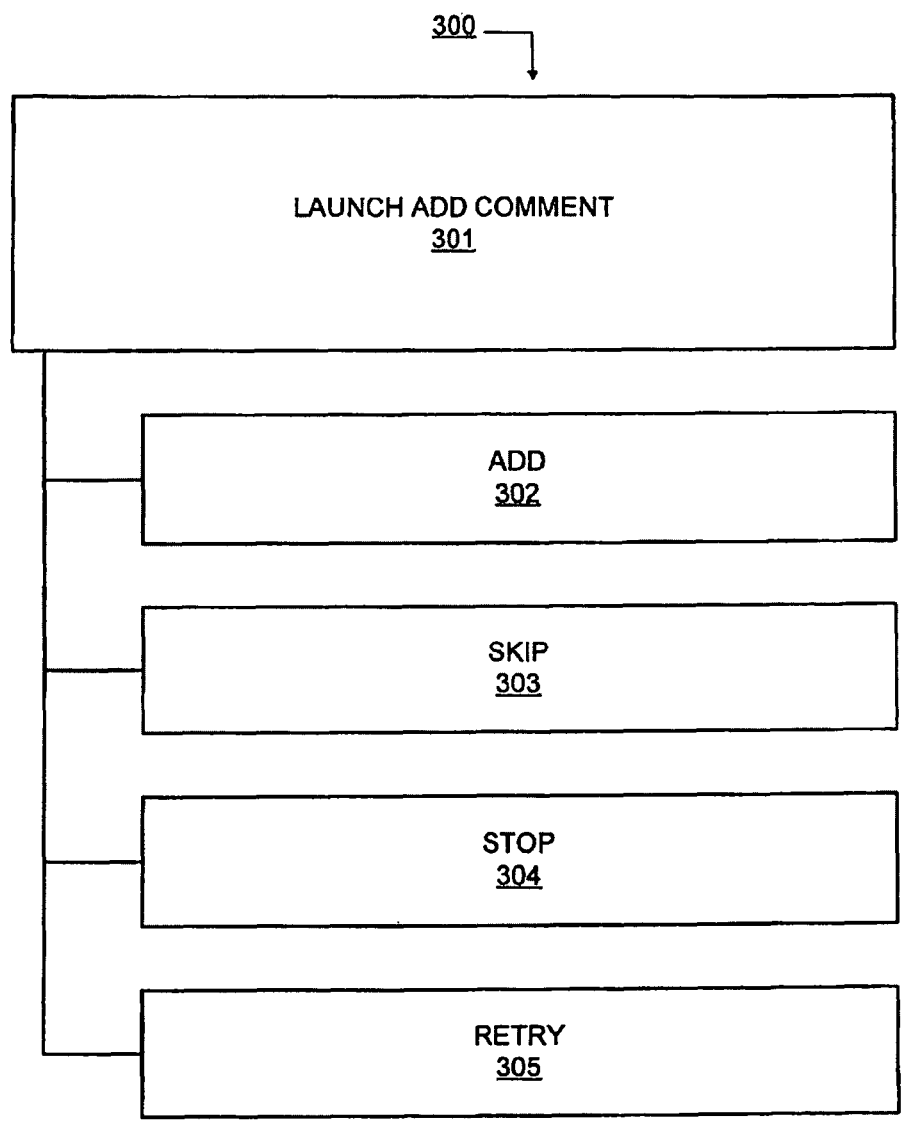
FIG. 3 shows a flowchart of an embodiment of an add comment procedure.

Referring to FIG. 3, add comment launches in block 301. The tester may choose to add a comment to the script before the step that generated the error in block 302. Some possible reasons why the script may require an added comment include: additional step(s) are needed before the current step, the step prior to the current step failed, synchronization issues, or a call to a missing function in the step. If the tester wishes to complete the test run, or if the AUT needs to be changed instead of the script or object repository, the tester may skip the step and continue running the test in block 303. This option requires ensuring that the AUT is ready for the next step in the script. In block 304, the tester may choose to stop the test run. Lastly, in option 305, the user may choose to retry running the current step.

Figure 10:
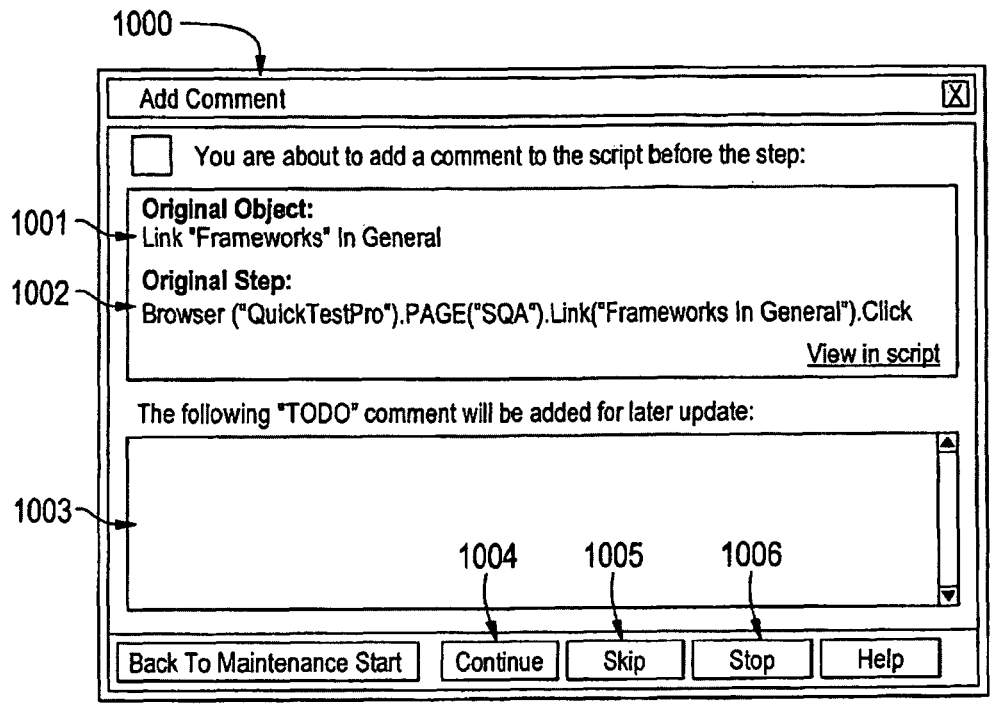
FIG. 10 shows an embodiment of an add comment dialog.

An embodiment of an add comment dialog 1000 is shown in FIG. 10. The object 1001 and the step 1002 that caused the error are displayed. The tester may enter comments into dialog box 1003, which are inserted into the script. The tester may click continue button 1004, skip button 1005, or stop button 1006, as desired according to the criteria outlined above with respect to FIG. 3.

Figure 11:
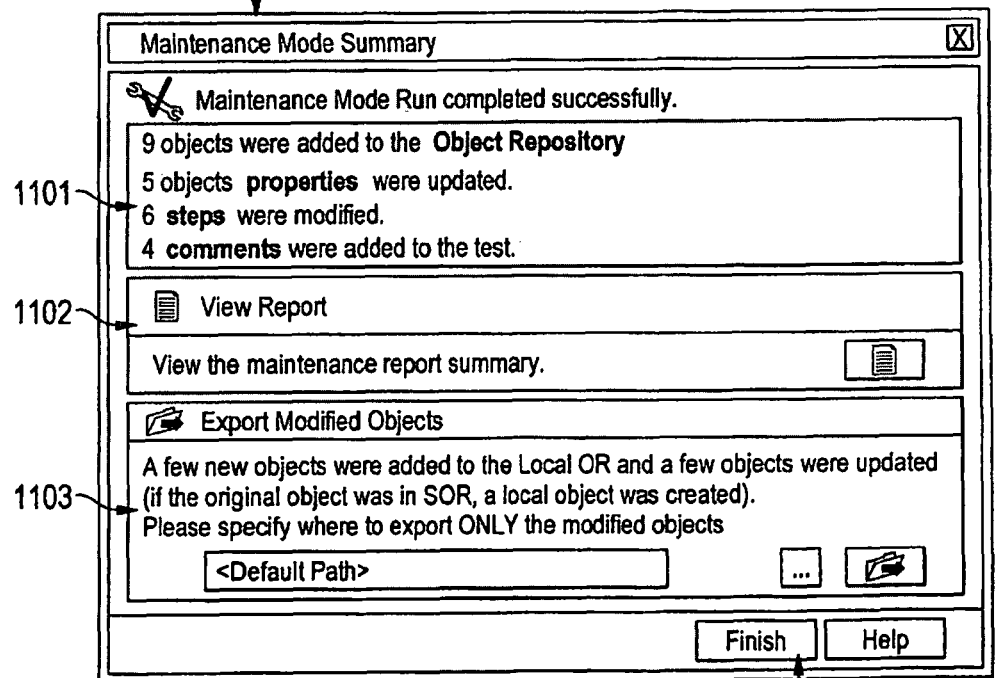
FIG. 11 shows an embodiment of a maintenance mode summary dialog.

Referring again to FIG. 1, after the point object 104A or add comment 104B procedures finish, a summary of changes made by the maintenance mode is generated in block 105. An embodiment of a view maintenance report dialog 1100 is shown in FIG. 11. In this dialog, the tester may see a summary of all the changes 1101 that were made to the test script and object repository by the maintenance mode. The tester may view a detailed report by clicking box 1102, and exit the maintenance mode by clicking finish button 1104.

The tester is given the option 1103 to export changes made to a local object repository to a shared object repository. Embodiments of a maintenance mode may not update or add objects to a shared object repository during execution, as changing the shared object repository might interfere with other testers who are using the shared object repository. A local copy of the shared object repository may be created for the maintenance mode to manipulate. Once the maintenance mode is complete, the tester may choose to update the shared object repository with the changes the maintenance mode has made to the local object repository using the maintenance mode. In order to update the shared object repository, the tester exports the local object repository and merges it with the shared object repository. Only the changes to the local object repository are exported in some embodiments, instead of exporting the entire local object repository. Embodiments of the maintenance mode may not update the script if the script is in read-only mode. Whether the script is in read-only mode may be displayed in action summary (see, e.g. FIG. 13, 1300).

Figure 12:
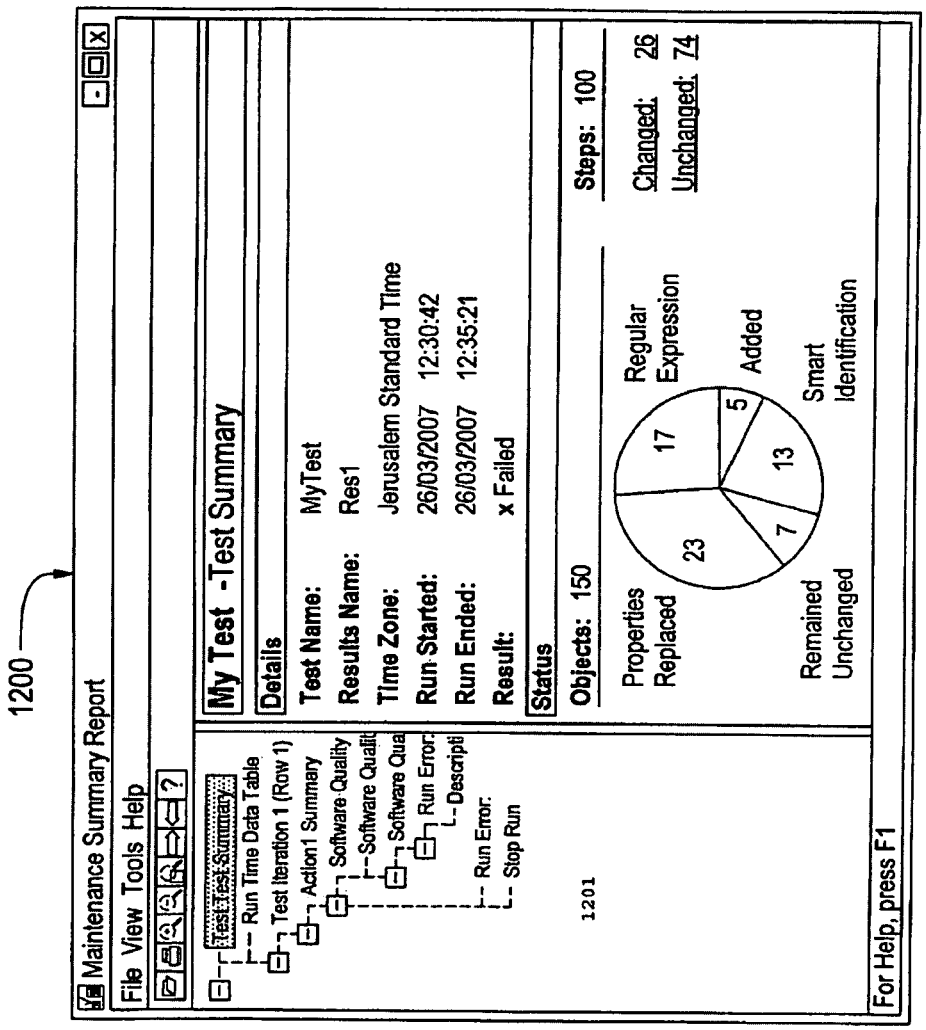
FIG. 12 shows an embodiment of a test summary dialog.
Figure 13:
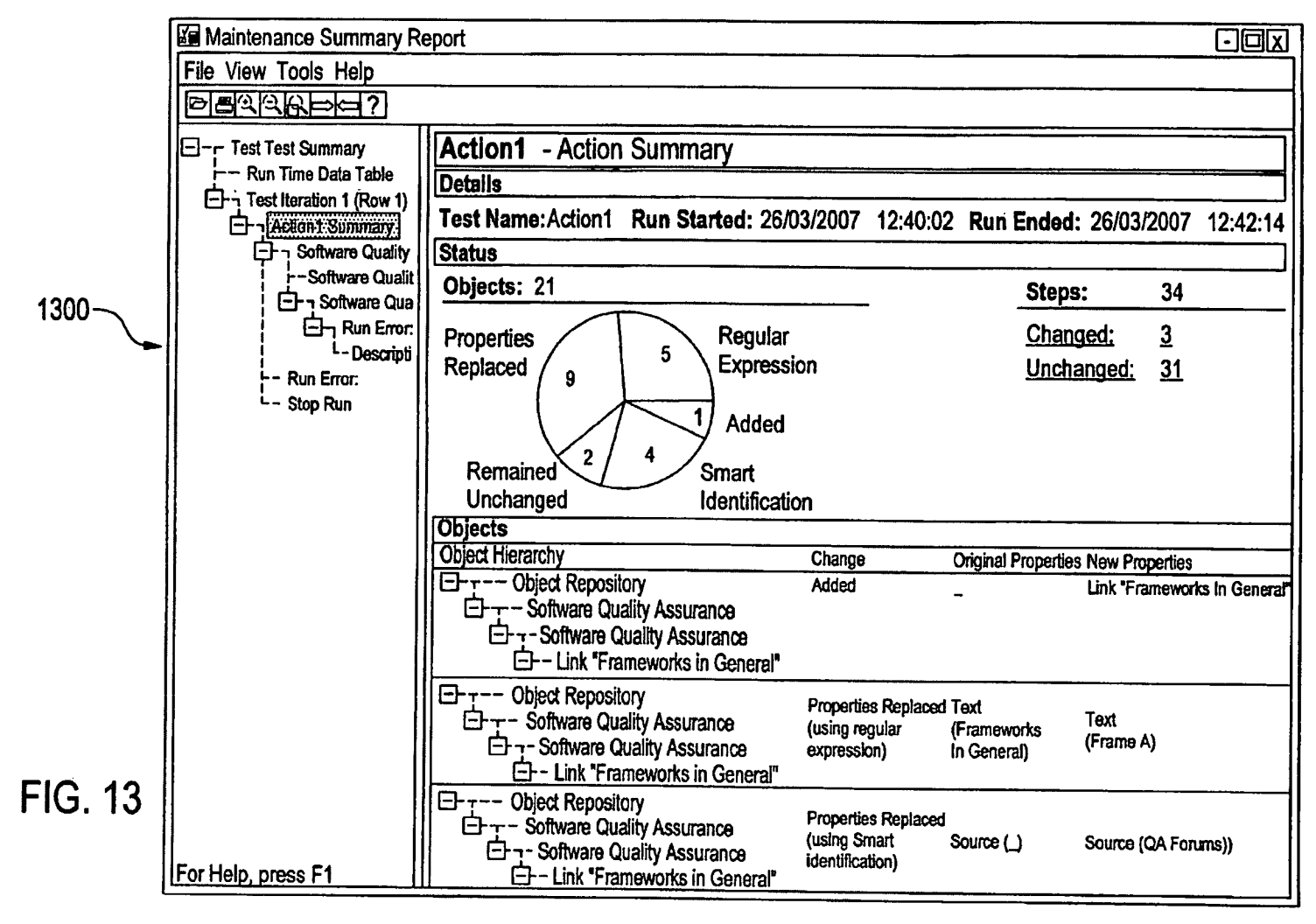
Figure 14:
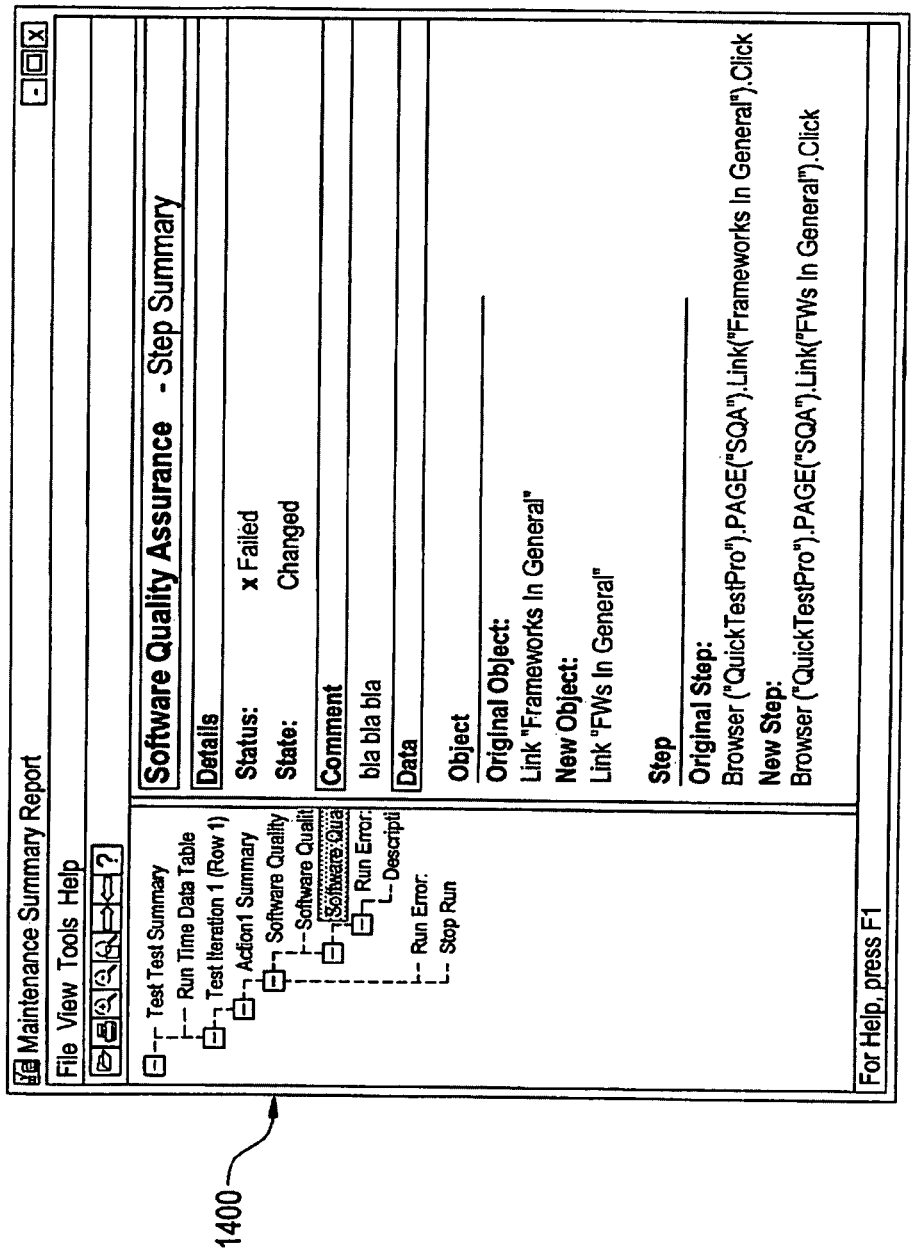
FIG. 14 shows an embodiment of a test summary dialog.

If the tester clicks on view report button 1102, detailed reports of the changes made by the maintenance mode may be displayed to the tester. FIG. 12 shows an embodiment of a test summary dialog 1200, which shows a detailed report of all changes made to the automated test. FIG. 13 shows an embodiment of an action and iteration summary dialog 1300, which shows details of changes to the object repository. In the action and iteration summary, the user may see the objects that were modified by the maintenance mode, and how they were modified. An embodiment of a step summary dialog 1400 is shown in FIG. 14; this dialog summarizes details of changes made to the test script. The summary 1400 may be filtered only to see changed or unchanged steps in the script, as desired by the tester. In some embodiments, the tester may be offered the option of printing the entire report. In some embodiments, the tester may access the summary screens of FIG. 13 and FIG. 14 by clicking on the appropriate items in the left-side menu 1201 of the test summary dialog 1200 of FIG. 12.

Figure 15:
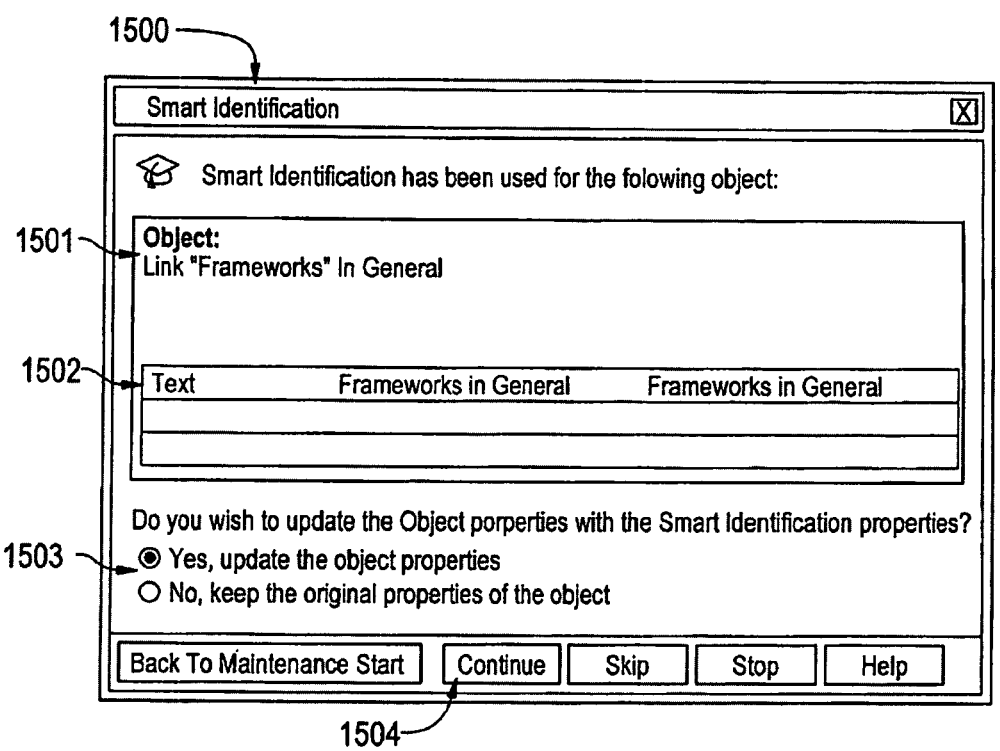
FIG. 15 shows an embodiment of a smart identification dialog.

Additionally, some embodiments of a maintenance mode may, when it encounters an object using smart identification during execution 101 of the testing script, notify the tester and prompt the tester to update the test object description and turn smart identification off. An embodiment of a smart identification dialog 1500 is shown in FIG. 15. Smart identification is a utility that automatically identifies objects without intervention by the tester. However, using smart identification may slow test execution, and thus it may be preferable to update the description of the object and turn smart identification off. The object using smart identification 1501 is displayed with description 1502, and the tester may choose whether to update the properties and turn smart identification off using input field 1503. The tester may then continue execution of the testing script by clicking continue button 1504.

Figure 16:
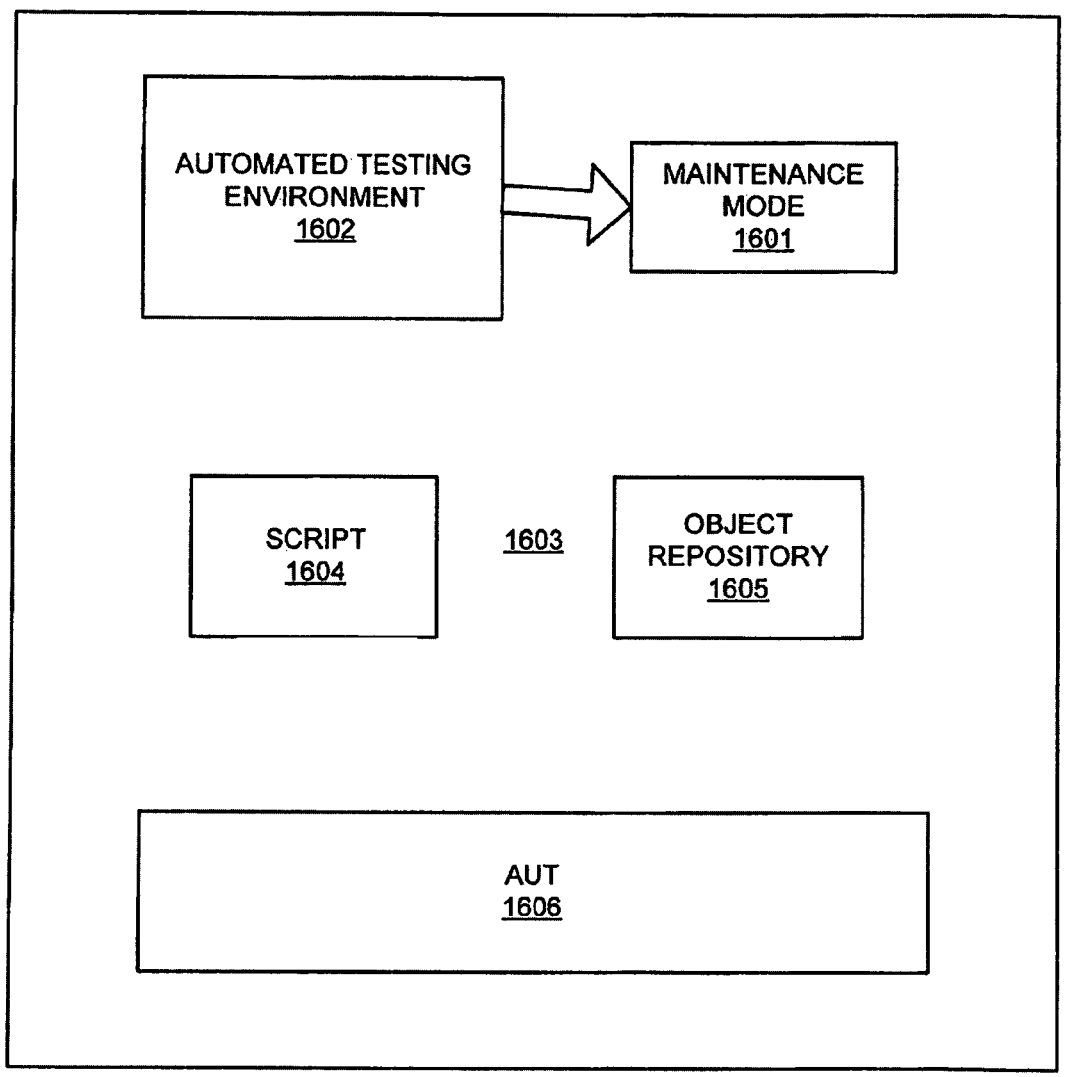
FIG. 16 shows an embodiment of an automated testing system comprising a maintenance mode.

FIG. 16 shows an embodiment of an automated testing system 1600 comprising a maintenance mode 1601. Automated testing environment 1602, script 1604, object repository 1605, and AUT 1606 reside on computer 1603. When an error is encountered during the execution of script 1604, automated testing environment 1602 calls maintenance mode 1601 to address the error. Maintenance mode 1601 may make changes to the script 1604, object repository 1605, or both. Computer 1603 may comprise any appropriate computer hardware and software. Some embodiment may comprise additional computers connected via a network. Automated testing environment 1602, script 1604, object repository 1605, and AUT 1606 may reside on any of the additional computers; the additional computers may communicate via the network to perform automated testing.

The foregoing disclosure of embodiments of the present disclosure has been presented for purposes of illustration and description. It is not intended to be exhaustive or to limit the disclosure to the precise forms disclosed. Many variations and modifications of the embodiments described herein will be evident to one of ordinary skill in the art in light of the above disclosure. Note that the aforementioned examples are not meant to be limiting. Additional embodiments of systems and methods are also contemplated that may include many of the above-described features. Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

Embodiments of the present disclosure can be implemented in hardware, software, firmware, or a combination thereof. In various embodiment(s), system components are implemented in software or firmware that is stored in a memory and that is executed by a suitable instruction execution system. If implemented in hardware, as in some embodiments, system components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Software components may comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In addition, the scope of the present disclosure includes embodying the functionality of one or more embodiments in logic embodied in hardware or software-configured mediums.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The invention claimed is:

1. A system for debugging an automated test, comprising a computer readable medium and a processor configured to fetch instructions from the computer readable medium and execute the instructions to implement a method comprising:
   monitoring an execution of a test script;
   upon detection of a failed step of the test script in the process of testing an application under test, prompting a user to change at least one of the failed step of the test script and an object repository of objects belonging to the application under test; and
   updating the at least one of the failed step of the script and the object repository according to input from the user entered in response to the prompting.

2. The system of claim 1, wherein the method includes analyzing at least one of the application under test, test script, and object repository, and wherein prompting comprises prompting the user to change at least one of the test script and the object repository based on the analysis.

3. The system of claim 2, wherein prompting comprises suggesting a regular expression.

4. The system of claim 2, wherein prompting comprises suggesting an object to add to the object repository.

5. The system of claim 4, wherein updating comprises changing the step to reference the suggested object.

6. The system of claim 2, wherein the suggestion comprises changing a set of properties of an object in the object repository.

7. The system of claim 2, wherein prompting comprises suggesting changing the step to reference an object belonging to the software application.

8. The system of claim 1, wherein the method includes prompting the user to enter a comment and wherein updating includes adding a comment entered by the user to the script.

9. A method of debugging an automated test of a software application, the automated test comprising a test script and an object repository, the method comprising:
   monitoring an execution of the test script;
   if a step in the test script fails, analyzing the test script, the software application, and the object repository;
   prompting a tester to change at least one of the failed step of the test script and the object repository based on the analysis; and
   updating the at least one of the script and the object repository according to input from the user entered in response to the prompting.

10. The method of claim 9, wherein:
    updating comprises adding an object to the object repository.

11. The method of claim 10, wherein:
    updating comprises changing the step to reference the added object.

12. The method of claim 9, wherein:
    updating comprises changing a set of properties of an object in the object repository.

13. The method of claim 9, wherein:
    updating comprises changing the step to reference an object belonging to the software application.

14. The method of claim 9, wherein:
    updating comprises adding a comment to the script.

15. A non-transitory computer readable storage medium comprising a program for debugging an automated test of a software application, the automated test comprising a test script and an object repository, the program when executed by a computer processor causing the processor to perform the steps of:
    monitoring an execution of the test script;
    if a step in the test script fails, analyzing the test script, the software application, and the object repository;
    prompting a tester to change at least one of the test script and the object repository based on the analysis; and
    updating the at least one of the script and the object repository according to input from the user entered in response to the prompting.

16. The medium of claim 15, wherein:
    updating comprises adding an object to the object repository.

17. The medium of claim 16, wherein:
    updating comprises changing the step to reference the added object.

18. The medium of claim 15, wherein:
    updating comprises changing a set of properties of an object in the object repository.

19. The medium of claim 15, wherein:
    updating comprises changing the step to reference an object belonging to the software application.

20. The medium of claim 15, wherein:
    updating comprises adding a comment to the script.

* * * * *